United States Patent
Dudar et al.

(10) Patent No.: US 10,207,583 B2
(45) Date of Patent: Feb. 19, 2019

(54) POST-IMPACT CONTROL SYSTEM

(71) Applicant: Ford Global Technologies, LLC, Dearborn, MI (US)

(72) Inventors: Aed M. Dudar, Canton, MI (US); Mahmoud Yousef Ghannam, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 124 days.

(21) Appl. No.: 15/242,655

(22) Filed: Aug. 22, 2016

(65) Prior Publication Data
US 2018/0050591 A1    Feb. 22, 2018

(51) Int. Cl.
| | |
|---|---|
| *G07C 5/00* | (2006.01) |
| *B60K 28/14* | (2006.01) |
| *F02D 41/26* | (2006.01) |
| *F02D 41/30* | (2006.01) |
| *F02D 41/22* | (2006.01) |
| *F02D 33/00* | (2006.01) |

(52) U.S. Cl.
CPC .............. *B60K 28/14* (2013.01); *F02D 41/26* (2013.01); *F02D 41/3005* (2013.01); *B60Y 2200/92* (2013.01); *B60Y 2306/13* (2013.01); *F02D 33/006* (2013.01); *F02D 41/22* (2013.01); *G07C 5/008* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,300,866 B1* | 10/2001 | Foith | ................. | B60R 21/01338 340/436 |
| 6,917,305 B2* | 7/2005 | King | ..................... | B60R 21/013 340/435 |
| 7,403,101 B2* | 7/2008 | Kropinski | .............. | B60Q 5/006 340/425.5 |
| 7,925,402 B2* | 4/2011 | Fujimoto | ............ | B60R 21/0136 180/273 |
| 8,307,934 B2* | 11/2012 | Rini | ......................... | A62C 3/07 180/271 |

(Continued)

FOREIGN PATENT DOCUMENTS

| | | |
|---|---|---|
| CN | 102826069 A | 12/2012 |
| KR | 1020120130354 A | 12/2012 |

(Continued)

OTHER PUBLICATIONS

UK Search Report re GB Application No. 1713223.4 dated Jan. 30, 2018.

*Primary Examiner* — Jonathan L Sample
(74) *Attorney, Agent, or Firm* — Frank A. MacKenzie; Bejin Bieneman PLC

(57) ABSTRACT

A control system in a vehicle includes a sensor and a control module. The sensor is programmed to detect an impact to the vehicle while the vehicle is in a key-off state and output an impact signal in response to detecting the impact. The control module is programmed to activate in response to the impact signal, receive a condition signal identifying a vehicle condition, and prevent at least one vehicle operation based at least in part on the condition signal.

17 Claims, 4 Drawing Sheets

(56) References Cited

U.S. PATENT DOCUMENTS

| | | | | |
|---|---|---|---|---|
| 8,799,034 | B1* | 8/2014 | Brandmaier | G07C 5/008 705/4 |
| 9,019,092 | B1* | 4/2015 | Brandmaier | B60R 25/102 340/426.1 |
| 9,218,698 | B2* | 12/2015 | Ricci | H04W 4/21 |
| 9,317,983 | B2* | 4/2016 | Ricci | H04W 4/21 |
| 9,649,895 | B2* | 5/2017 | McCormick | B60C 23/0408 |
| 2002/0075139 | A1* | 6/2002 | Yamamoto | B60R 21/013 340/436 |
| 2003/0212475 | A1* | 11/2003 | Yamagishi | G08G 1/205 701/1 |
| 2004/0088090 | A1* | 5/2004 | Wee | G07C 5/085 701/33.4 |
| 2008/0079554 | A1* | 4/2008 | Boice | B60R 25/305 340/436 |
| 2008/0154691 | A1* | 6/2008 | Wellman | G05D 1/0282 705/7.26 |
| 2009/0066488 | A1* | 3/2009 | Qiahe | B60R 25/102 340/426.1 |
| 2009/0212993 | A1* | 8/2009 | Tsunekawa | B60R 21/0134 342/71 |
| 2010/0138242 | A1* | 6/2010 | Ferrick | G06Q 10/087 705/4 |
| 2011/0128118 | A1* | 6/2011 | Gilleland | B60R 25/24 340/5.2 |
| 2011/0137489 | A1* | 6/2011 | Gilleland | B60R 25/24 701/2 |
| 2013/0226369 | A1* | 8/2013 | Yorio | G06F 17/00 701/1 |
| 2014/0054880 | A1* | 2/2014 | Feinstein | B60R 21/203 280/731 |
| 2014/0084656 | A1* | 3/2014 | Hozumi | B60N 2/0244 297/344.1 |
| 2014/0306826 | A1* | 10/2014 | Ricci | H04W 4/21 340/573.1 |
| 2015/0158447 | A1* | 6/2015 | Nonaka | B60R 21/015 340/436 |
| 2015/0221142 | A1* | 8/2015 | Kim | G07C 5/008 701/31.5 |
| 2015/0356793 | A1* | 12/2015 | Dietz | G07C 5/00 701/1 |
| 2016/0152211 | A1* | 6/2016 | Owens | B60R 25/102 348/36 |
| 2016/0208537 | A1* | 7/2016 | Senguttuvan | B60W 50/0098 |
| 2016/0257203 | A1* | 9/2016 | Thoemmes | B60K 28/14 |
| 2016/0311385 | A1* | 10/2016 | Wojcik | B60R 16/03 |
| 2017/0148235 | A1* | 5/2017 | Yakub | G07C 5/0816 |

FOREIGN PATENT DOCUMENTS

| | | |
|---|---|---|
| KR | 1020160083488 A | 7/2016 |
| WO | WO 2012124877 A1 | 9/2012 |
| WO | 2015051863 A1 | 4/2015 |

* cited by examiner

POST-IMPACT CONTROL SYSTEM

BACKGROUND

Vehicles often operate in either a key-on or a key-off state. In the key-on state, an engine or motor of the vehicle is running and supplies full power to any active vehicle system. In the key-off state, an occupant has turned off the engine or motor, and a battery of the vehicle supplies power to select systems, such as a clock or a security alarm. A vehicle may be equipped with impact sensors that operate while the vehicle is in the key-on state. The impact sensors are adapted to detect an impact to the vehicle. The impact sensors may be located at numerous points in or on the vehicle. Some impact sensors are post-contact sensors such as accelerometers, pressure sensors, and contact switches; and pre-impact sensors such as radar, lidar, and vision-sensing systems. Vision systems include one or more cameras, CCD image sensors, CMOS image sensors, etc.

DETAILED DESCRIPTION

Figure 1:
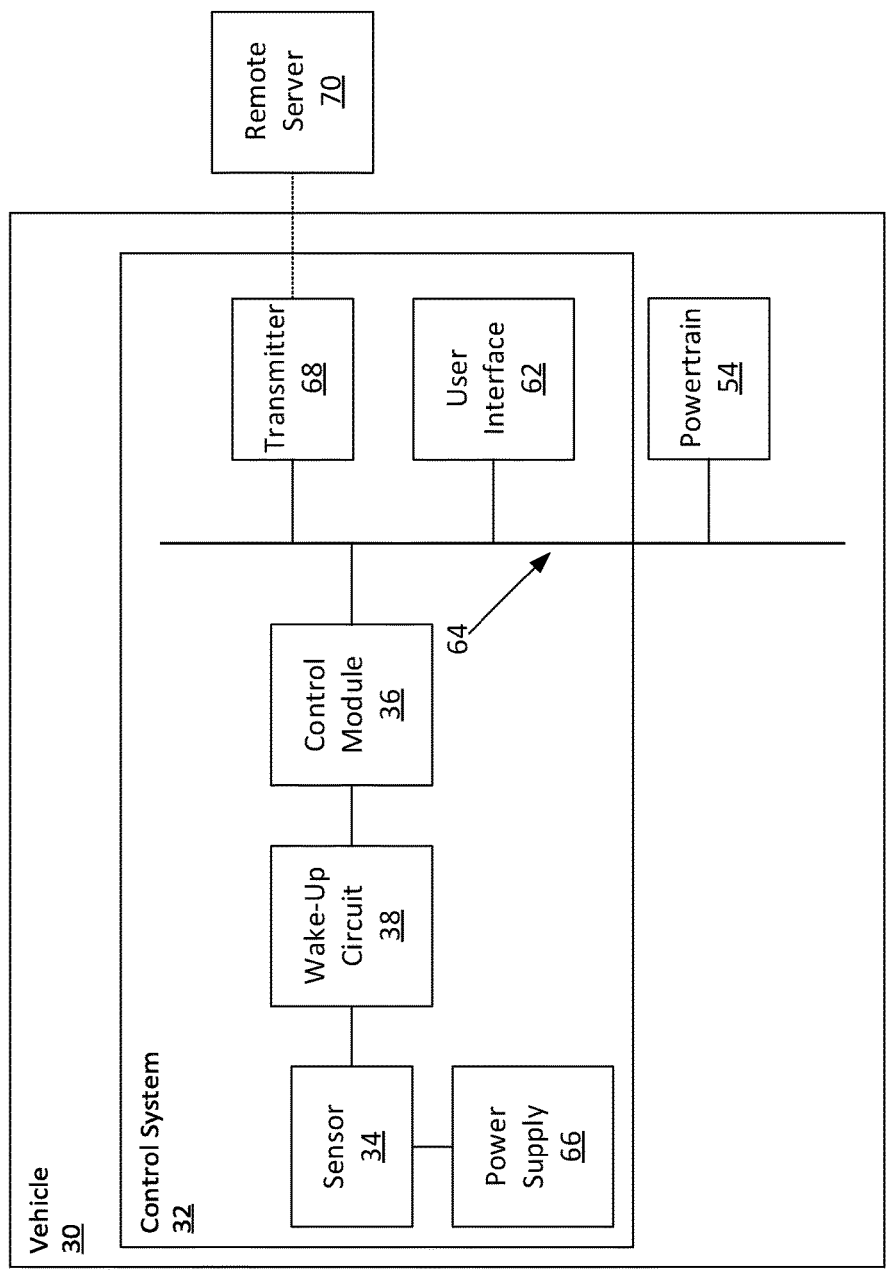
FIG. 1 is a block diagram of a post-impact control system in a vehicle.

With reference to the Figures, wherein like numerals indicate like parts throughout the several views, a control system 32 in a vehicle 30 includes a sensor 34 and a control module 36. The sensor 34 is programmed to detect an impact to the vehicle 30 while the vehicle 30 is in a key-off state and output an impact signal in response to detecting the impact. The control module 36 is programmed to activate in response to the impact signal, receive a condition signal identifying a vehicle condition, and prevent at least one vehicle operation based at least in part on the condition signal.

The control system 32 can assess the condition of the vehicle 30 independent of human judgment and when the vehicle 30 is in a key-off state. The vehicle 30 may be autonomous and will next be driven without a human driver. In that case, the control system 32 can still determine whether the vehicle 30 is safe to operate without human decision-making. The control system 32 increases the safety of the vehicle 30 by preventing operation of the vehicle 30 if the vehicle 30 has sustained a certain amount of damage from an impact. The control system 32 detects an impact even when the vehicle 30 is in a key-off state and other impact sensors are not active. The control system 32 may prevent further damage by preventing the vehicle 30 from starting when the vehicle 30 has sustained damage.

The vehicle 30 may be an autonomous vehicle. A vehicle controller, sometimes referred to as the "virtual driver," may be capable of operating the vehicle independently of the intervention of a human driver, to a greater or a lesser degree. The vehicle controller may be programmed to operate the engine, braking system, steering, and/or other vehicle systems. The vehicle 30 may be in either a key-on or a key-off state. In the key-on state, an engine or motor of the vehicle 30 is running and supplies full power to any active vehicle system. In the key-off state, an occupant has turned off the engine or motor, and a power supply 66 not dependent on the engine or motor such as a battery of the vehicle 30 supplies power to select systems, such as a clock or a security alarm.

With reference to FIG. 1, the sensor 34 is programmed to detect an impact to the vehicle 30 while the vehicle 30 is in the key-off state and output an impact signal in response to detecting the impact. The sensor 34 is electrically connected to the power supply 66 that is active during the key-off state. The sensor 34 is thus "hot at all times" (HAAT). The sensor 34 is in communication with the control module 36, either directly or indirectly through a wake-up circuit 38.

The sensor 34 is implemented via circuits, chips, or other electronic components. The sensor 34 may be, for example, an accelerometer, an angular-rate sensor, a vibration detector, or a level indicator for a fluid stored by the vehicle 30. The sensor 34 detects an impact indirectly through the results of the impact on some state of the vehicle 30, for example, linear or angular acceleration, vibrations, or sloshing or level change of a fluid stored in the vehicle 30. The aspect of the vehicle 30 detected by the sensor 34 generally should not change when the vehicle 30 is in the key-off state unless an impact occurs. As an accelerometer, the sensor 34 may be, for example a three-dimensional linear accelerometer such as piezo-electric or microelectromechanical systems (MEMS). As an angular-rate sensor, the sensor 30 may be, for example, a three-dimensional gyroscope such as a rate, ring laser, or fiber-optic gyroscope. The sensor 34 may be a combined accelerometer and gyroscope. As a vibration sensor, the sensor 34 may be attached to, e.g., a radio antenna or another isolated position within the vehicle 30. The sensor 34 may be, e.g., a piezoelectric accelerometer, a velocity sensor such as an electromagnetic linear velocity transducer, a capacitance or eddy current proximity probe, or a laser displacement sensor. The sensor 34 may be powered through solar power if positioned on an external component such as the radio antenna. As a level indicator for a fluid, the sensor 34 may be, for example, a fuel-level gauge, windshield-washer fluid gauge, an oil indicator, etc. The sensor 34 may detect a sudden decrease in a fluid level while the vehicle 30 is in the key-off state, or the sensor 34 may detect fluctuations in the fluid level such as those caused by sloshing.

Figure 2:
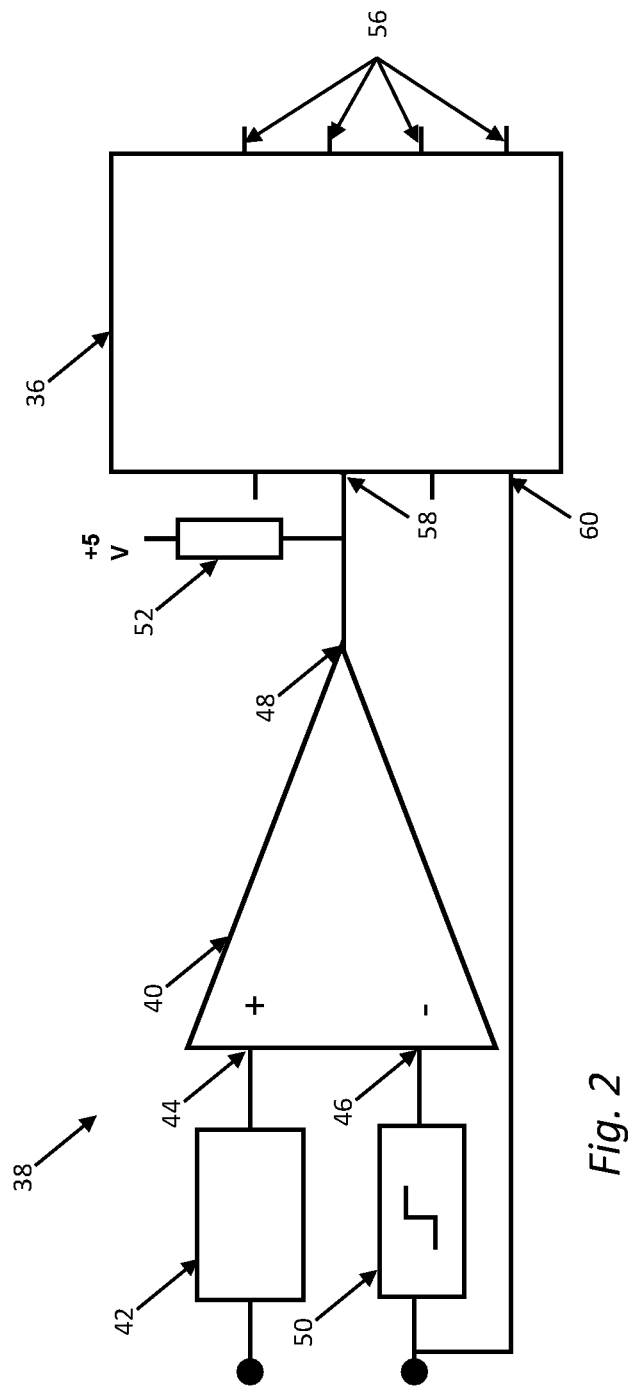
FIG. 2 is a circuit diagram of a sensor, wake-up circuit, and control module in the post-impact control system.

With reference to FIG. 2, the wake-up circuit 38 is in communication with the sensor 34 and the control module 36. The wake-up circuit 38 may include a high-pass filter 42 in communication with the sensor 34 and an operational amplifier 40 in communication with the high-pass filter 42 and the control module 36. The high-pass filter 42 may be connected to a noninverting input 44 of the operational amplifier 40. The control module 36 may be connected to an output 48 of the operational amplifier 40. The wake-up circuit 38 may include a latch chip 50 connected to the inverting input 46 of the operational amplifier 40 and to the control module 36. A pull-up resistor 52 may be connected to the output 48 of the operational amplifier 40.

The wake-up circuit 38 may receive the impact signal and output different voltages based on whether the impact signal satisfies at least one impact criterion. The impact criterion is a threshold value of the state of the vehicle 30 detected by the sensor 34. Specifically, the sensor 34 generates the impact signal in response to an impact, and the magnitude of the impact signal correlates with the magnitude of the impact. The sensor 34 sends the impact signal to the high-pass filter 42. An impact signal from, for example, another vehicle hitting the vehicle 30 at 5 miles per hour may satisfy the impact criterion, and an impact signal from, for example, a shopping cart hitting the vehicle 30 may fail to satisfy the impact criterion. The voltage of the output of the operational amplifier 40 is greater than zero when the impact criterion is not satisfied and equal to zero when the impact criterion is satisfied. A zero-voltage output from the wake-up circuit 38 may constitute a wake-up signal to the control module 36.

With reference to FIG. 1, the power supply 66 may be active during the key-off state of the vehicle 30 and electrically connected to the sensor 34. The power supply 66 may be, for example, a vehicle battery.

With reference to FIGS. 1 and 2, the control module 36 is a microprocessor-based controller. The control module 36 is implemented via circuits, chips, or other electronic components. The control module 36 may include a processor, memory, etc. The memory of the control module 36 may include memory for storing instructions executable by the processor as well as for electronically storing data and/or databases. The control module 36 may be, for example, a powertrain control module and may be in communication with and may control systems of a powertrain 54 of the vehicle 30, among other functions. The control module 36 may receive input and transmit output through a plurality of pins 56, for example, eight pins 56. The output 48 of the operational amplifier 40 may be connected to a wake-up input pin 58, which upon receiving a signal powers on the control module 36 if the control module 36 is in a powered-down state. The latch chip 50 of the wake-up circuit 38 may be connected to a digital-analog output pin 60 of the control module 36.

The control system 32 may transmit signals through a communications network 64 such as a controller area network (CAN) bus, Ethernet, Local Interconnect Network (LIN), and/or by any other wired or wireless communications network.

The powertrain 54 of the vehicle 30 includes a fuel pump, an internal-combustion engine, a transmission, and if the vehicle 30 is hybrid-electric, an electric motor and a battery pack. The fuel pump may draw fuel from a fuel tank to the engine. The battery pack is connected to the electric motor. In a conventional powertrain, the engine is rotationally coupled to the transmission. In a hybrid powertrain, the electric motor is coupled to the transmission and transmits rotational kinetic energy to the transmission, and the engine may be coupled to either the electric motor or to the transmission. The transmission transmits the kinetic energy from the electric motor and/or the internal-combustion engine to a drive axle and ultimately to wheels of the vehicle 30, while applying a gear ratio allowing different tradeoffs between torque and rotational speed.

The control module 36 may be in communication with one or more systems of the powertrain 54 of the vehicle 30, including the fuel pump, the engine, the transmission, the electric motor, and the battery pack. The control module 36 may be able to send instructions to the vehicle powertrain systems. Specifically, the control module 36 may be able to deactivate one or more of the vehicle powertrain systems; for example, the control module 36 may be able to deactivate the fuel pump and prevent fuel from being drawn to the engine and thus prevent operation of the vehicle 30.

A user interface 62 may be in communication with the control module 36. The user interface 62 presents information to and receives information from an occupant of the vehicle 30. The user interface 62 may be located, e.g., on an instrument panel in a passenger cabin of the vehicle 30, or wherever may be readily seen by the occupant. The user interface 62 may include components spread over multiple locations in the passenger cabin. The user interface 62 may include dials, digital readouts, screens, speakers, and so on for providing information to the occupant. The user interface 62 may include buttons, knobs, keypads, microphone, and so on for receiving information from the occupant.

A transmitter 68 may be in communication with the control module 36. The transmitter 68 may be adapted to transmit signals wirelessly through any suitable wireless communication protocol, such as Bluetooth®, WiFi, 802.11a/b/g, radio, etc. The transmitter 68 may be adapted to communicate with a remote server 70, that is, a server distinct and spaced from the vehicle 30. The remote server 70 may be located outside the vehicle 30. For example, the remote server 70 may be associated with other vehicles (e.g., V2V communications), infrastructure components (e.g., V2I communications), emergency responders, mobile devices associated with the owner of the vehicle 30, etc.

Figure 3:
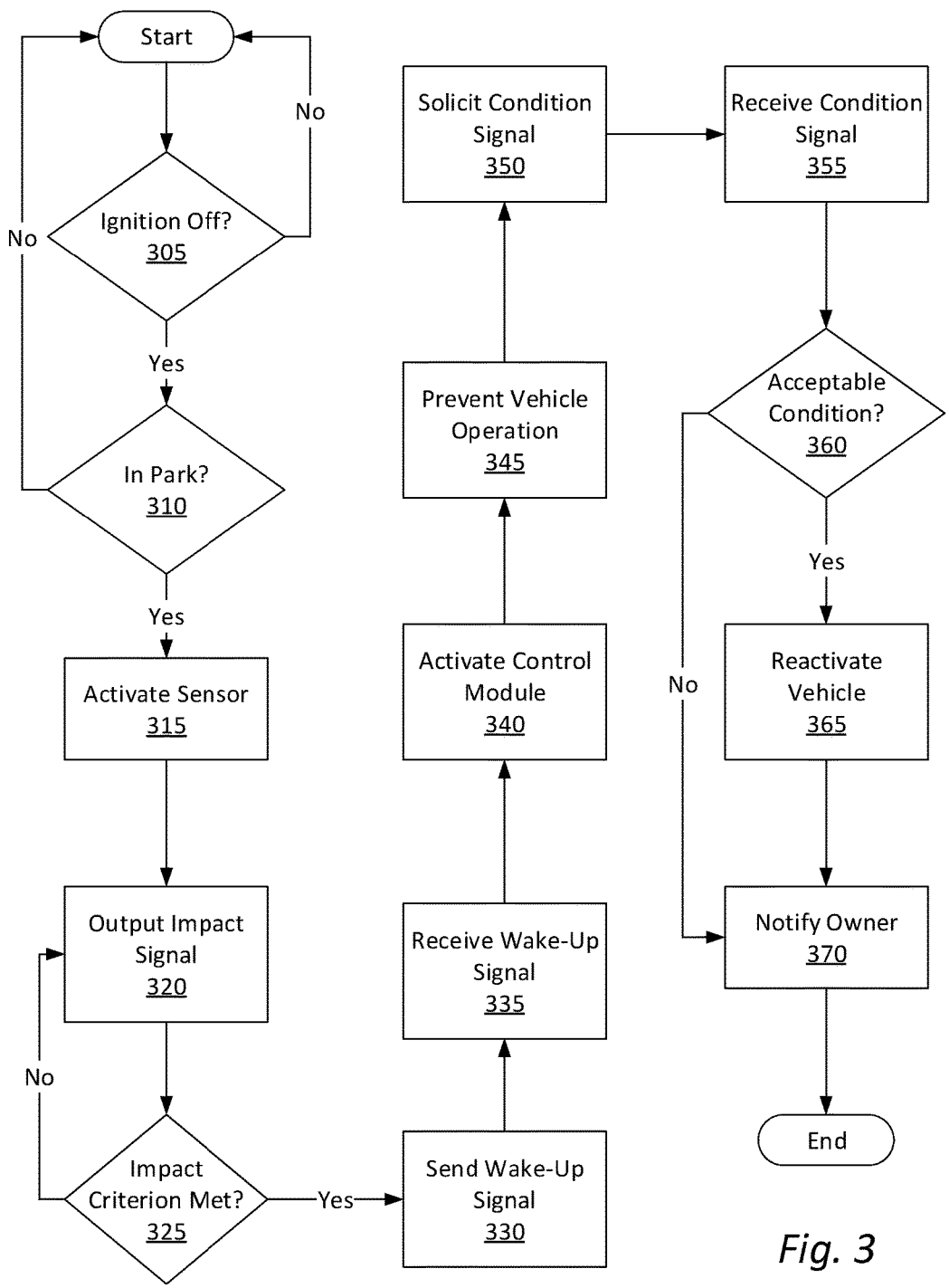
FIG. 3 is a process flow diagram of an example process for responding to an impact to the vehicle in a key-off state.

FIG. 3 is a process flow diagram illustrating an exemplary process 300 for responding to an impact to the vehicle 30 in a key-off state. The process 300 begins in a decision block 305, which determines whether an ignition of the vehicle 30 is off. If the ignition is on, the process 300 proceeds back to the start. If the ignition is off, the process 300 proceeds to a decision block 310, which determines whether a gear of the vehicle 30 is in park. If the gear is not in park, the process 300 proceeds back to the start. If the gear is in park, the process 300 continues to a block 315. Together, the decision blocks 305, 310 determine whether the vehicle 30 is in the key-off state.

If the vehicle 30 is in the key-off state, next, in the block 315, the sensor 34 is activated. In other words, the sensor 34 becomes ready to detect impacts to the vehicle 30.

Next, in a block 320, the sensor 34 is programmed to output an impact signal to the wake-up circuit 38. The impact signal is dependent on the nature of an impact to the vehicle 30. For example, if the sensor 34 is an accelerometer or an angular-rate sensor, the impact signal may be a peak linear or angular acceleration experienced by the sensor 34. For another example, if the sensor 34 is a vibration detector, the impact signal may be a peak voltage or current induced by a vibration. For a third example, if the sensor 34 is a level indicator for a fluid, the impact signal may be a maximum difference between measurements over a period of time.

Next, in a decision block 325, the wake-up circuit 38 determines if the impact to the vehicle 30 satisfies the at least one impact criterion. In other words, the wake-up circuit 38 determines if the impact signal from the sensor 34 satisfies the impact criterion. If the impact does not satisfy the impact criterion, the process 300 proceeds back to the block 320, and the wake-up circuit 38 waits for the next impact signal.

If the impact satisfies the at least one impact criterion, next, in a block 330, the wake-up circuit 38 outputs the wake-up signal to the control module 36.

Next, in a block 335, the control module 36 receives the wake-up signal indicating an impact while the control module 36 is in a powered-down state.

Next, in a block 340, the control module 36 activates in response to the impact signal. Specifically, the wake-up signal arrives at the wake-up input pin 58 of the control module 36, causing the control module 36 to power on from a powered-down state.

Next, in a block 345, the control module 36 prevents at least one vehicle operation. Preventing the at least one vehicle operation could disable the vehicle 30, so the vehicle 30 cannot drive until the vehicle operation is no longer prevented by the control module 36. Preventing the at least one vehicle operation may alternatively include deactivating one or more vehicle components, such as a vehicle powertrain system of the powertrain 54, for example, the fuel pump. Deactivating the fuel pump prevents fuel from being moved out of the fuel tank and into other areas of the vehicle 30.

Next, in a block 350, the control module 36 commands the transmitter 68 to transmit a message to a remote server 70 soliciting a condition signal identifying a vehicle condition. The vehicle condition refers to the extent of damage, if any, to the vehicle 30. For example, the remote server 70 may be a nearby vehicle equipped with cameras, and the pictures from the cameras may identify the vehicle condition. For another example, the remote server 70 may be a drone equipped with a camera and/or a hydrocarbon sensor sent by an emergency responder, towing company, or the like in response to the message soliciting the condition signal. The drone may use its cameras to take pictures identifying the vehicle condition and may use the hydrocarbon sensor to detect a fuel leak, thus identifying the vehicle condition. For a third example, the remote server 70 may be a device of an emergency responder, and the emergency responder may report the vehicle condition into the device. The condition of the vehicle detected by the remote sensor 70 includes, for example, the position of vehicle components relative to other vehicle components, such as a wheel relative to a body; deformations of body panels of the vehicle 30, broken windows of the vehicle 30, spilled fluids such as fuel from the vehicle 30, etc.

Next, in a block 355, the control module 36 receives the condition signal identifying the vehicle condition from the remote server 70. For as long as the control module 36 does not receive the condition signal from any remote servers 70, the control module 36 continues to prevent at least one vehicle operation as described above with respect to the block 345.

Next, in a decision block 360, the control module 36 determines whether the vehicle 30 is in acceptable condition to drive based on the condition signal. Whether the vehicle 30 is in acceptable condition may depend on whether the vehicle 30 has avoided certain types or amounts of damage from the collision. For example, if one or more wheels of the vehicle 30 are askew rather than vertical, then the vehicle 30 is deemed not in acceptable condition. For another example, if intrusion of certain areas of the vehicle, such as a body panel above a fuel tank or an engine, exceeds a maximum distance, then the vehicle 30 is deemed not in acceptable condition. For a third example, if fuel is detected outside the vehicle 30, then the vehicle 30 is deemed not in acceptable condition. If the vehicle 30 is not in acceptable condition to drive, the process 300 proceeds to a block 370 while the control module 36 continues to prevent the at least one vehicle operation, as described above with respect to the block 345, based at least in part on the condition signal.

If the vehicle 30 is in acceptable condition to drive, next, in a block 365, the control module 36 reactivates the vehicle 30 by ceasing to prevent the at least one vehicle operation. The control module 36 may send a signal to reactivate the at least one vehicle operation or stop sending a signal deactivating the at least one vehicle operation.

Next, or after the decision block 360 if the vehicle 30 is not in condition to drive, in the block 370, the control module 36 communicates a message to an owner of the vehicle 30 about the impact. The message may identify the vehicle condition, including whether the vehicle 30 is operational. For example, the control module 36 may query a database for the owner of the vehicle 30 and a remote server 70 associated with the owner of the vehicle 30 and command the transmitter 68 to wirelessly transmit a message to the remote server 70 associated with the owner of the vehicle 30 identifying the vehicle condition. For another example, the control module 36 may command the user interface 62 to display a message based at least in part on the vehicle condition. The message on the user interface 62 may be displayed immediately or upon a return of the owner or another person to the vehicle 30.

Figure 4:
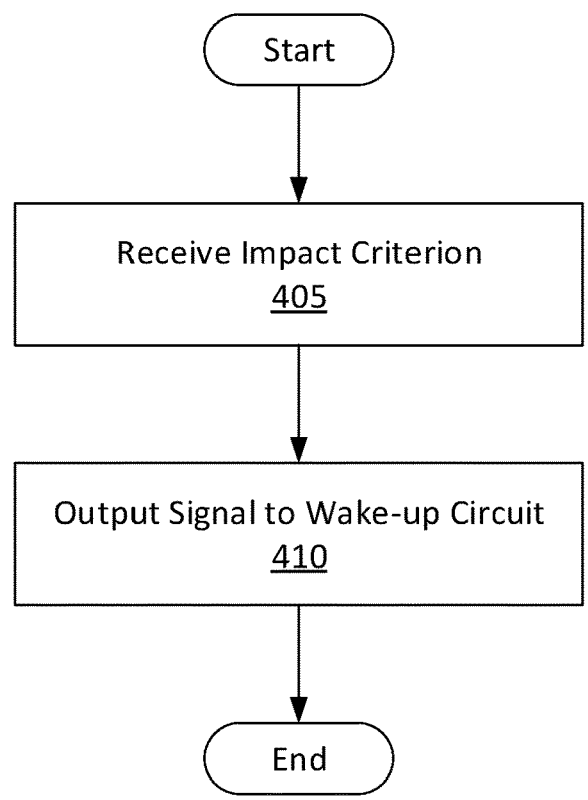
FIG. 4 is a process flow diagram of an example process for setting an impact criterion.

FIG. 4 is a process flow diagram illustrating an exemplary process 400 for setting an impact criterion. The process 400 begins in a block 405, in which the control module 36 receives an input indicating the at least one impact criterion. The input may be, for example, a value for the impact criterion or a choice from among a set of preset levels, e.g., low, medium, and high sensitivity. For example, if the vehicle 30 is a commercial truck, a user may set the impact criterion to low sensitivity to prevent false positives of impacts from shakes while loading the truck.

Next, in a block 410, the control module 36 outputs a signal to the wake-up circuit 38 setting the at least one impact criterion. Specifically, the control module 36 outputs the signal from the digital-analog output pin 60 to the latch chip 50 in the wake-up circuit 38 setting a value within the latch chip 50. The at least one impact criterion used by the wake-up circuit 38 is thus based at least in part on the signal received from the control module 36.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system in a vehicle comprising:
   a sensor programmed to detect an impact to the vehicle while the vehicle is in a key-off state and output an impact signal in response to detecting the impact;
   a transmitter; and
   a control module in communication with the transmitter and programmed to activate in response to the impact signal, receive a condition signal representing an extent of damage to the vehicle from a remote server, prevent at least one vehicle operation based at least in part on the condition signal, query a database for an owner of the vehicle and a second remote server associated with the owner of the vehicle, and command the transmitter to transmit a message to the second remote server representing an extent of damage to the vehicle.

2. The system of claim 1, wherein the control module is programmed to command the transmitter to transmit a message to a remote server soliciting the condition signal.

3. The system of claim 1, wherein preventing the at least one vehicle operation includes deactivating a vehicle powertrain system.

4. The system of claim 3, wherein the vehicle powertrain system is a fuel pump.

5. The system of claim 1, further comprising a user interface in communication with the control module, wherein the control module is programmed to command the user interface to display a message based at least in part on the extent of damage to the vehicle.

6. The system of claim 1, wherein the sensor is at least one of an accelerometer, an angular-rate sensor, a vibration detector, and a level indicator for a fluid.

7. The system of claim 1, further comprising a wake-up circuit in communication with the sensor and the control module, wherein the sensor is programmed to output the impact signal to the wake-up circuit, and wherein the wake-up circuit determines if the impact to the vehicle satisfies at least one impact criterion and outputs a wake-up signal to the control module if the impact signal satisfies the at least one impact criterion.

8. The system of claim 7, wherein the at least one impact criterion is based at least in part on a signal received from the control module.

9. The system of claim 8, wherein the control module is programmed to receive an input indicating the at least one impact criterion and output the signal to the wake-up circuit setting the at least one impact criterion.

10. The system of claim 7, wherein the wake-up circuit includes a high-pass filter in communication with the sensor and an operational amplifier in communication with the high-pass filter and the control module.

11. The system of claim 1, further comprising a power supply active during a key-off vehicle state and electrically connected to the sensor.

12. A control module comprising a processor and a memory storing processor-executable instructions, wherein the processor is programmed to:
    while in a powered-down state, receive a wake-up signal indicating an impact to a vehicle;
    receive a condition signal representing an extent of damage to the vehicle from a remote server;
    prevent at least one vehicle operation based at least in part on the condition signal;
    query a database for an owner of the vehicle and a second remote server associated with the owner of the vehicle; and
    command a transmitter to transmit a message to the second remote server representing an extent of damage to the vehicle.

13. The control module of claim 12, wherein the processor is further programmed to command a transmitter to transmit a message to a remote server soliciting the condition signal.

14. The control module of claim 12, wherein preventing the at least one vehicle operation includes deactivating a vehicle powertrain system.

15. The control module of claim 14, wherein the vehicle powertrain system is a fuel pump.

16. The control module of claim 12, wherein the processor is further programmed to command the user interface to display a message based at least in part on the extent of damage to the vehicle.

17. The control module of claim 12, wherein the processor is further programmed to receive an input indicating at least one impact criterion and output a signal to a wake-up circuit in communication with the control module setting the at least one impact criterion.

* * * * *